US008315416B2

(12) United States Patent
Lee

(10) Patent No.: US 8,315,416 B2
(45) Date of Patent: Nov. 20, 2012

(54) NECKLACE TYPE DETACHABLE THREE DIMENSIONAL SOUND REPRODUCTION APPARATUS

(75) Inventor: Duck Soo Lee, Seoul (KR)

(73) Assignee: Neofidelity, Inc., Seoul (KR)

( * ) Notice: Subject to any disclaimer, the term of this patent is extended or adjusted under 35 U.S.C. 154(b) by 1427 days.

(21) Appl. No.: 11/769,822

(22) Filed: Jun. 28, 2007

(65) Prior Publication Data

US 2008/0013778 A1 Jan. 17, 2008

(30) Foreign Application Priority Data

Jul. 12, 2006 (KR) .................. 10-2006-0065317

(51) Int. Cl.
*H04R 1/02* (2006.01)
*H04R 9/06* (2006.01)

(52) U.S. Cl. ............ 381/334; 381/77; 381/87; 381/300; 381/311; 381/332; 381/333; 381/385; 381/386; 381/388

(58) Field of Classification Search .................. 381/334, 381/385, 300, 311, 77, 87, 332, 333, 386, 381/388
See application file for complete search history.

(56) References Cited

U.S. PATENT DOCUMENTS

| 5,757,929 | A  | * | 5/1998 | Wang et al. ................... 381/300 |
| 2003/0067535 | A1 | * | 4/2003 | Creed et al. ................ 348/14.04 |
| 2004/0209654 | A1 | * | 10/2004 | Cheung et al. ................ 455/567 |
| 2006/0234780 | A1 | * | 10/2006 | Ramsden et al. .......... 455/569.1 |
| 2007/0206827 | A1 | * | 9/2007 | Tupman et al. ............... 381/334 |

* cited by examiner

*Primary Examiner* — Vivian Chin
*Assistant Examiner* — Paul Kim
(74) *Attorney, Agent, or Firm* — Sughrue Mion, PLLC

(57) ABSTRACT

A necklace type sound reproduction apparatus is disclosed. The apparatus is detachable from a media player to be worn on a neck of a user. An acoustic sound reproduced by a digital amplifier and a speaker of the apparatus is delivered to an ear of the user without using an earphone or a headphone via an audio signal processing.

11 Claims, 5 Drawing Sheets

NECKLACE TYPE DETACHABLE THREE DIMENSIONAL SOUND REPRODUCTION APPARATUS

BACKGROUND OF THE INVENTION

1. Field of the Invention

The present invention relates to a necklace type sound reproduction apparatus, and in particular, to necklace type sound reproduction apparatus detachable from a media player, wherein an acoustic sound is delivered to an ear of a user without using an earphone or a headphone.

2. Description of the Related Art

Recently, a popularity of media players for a playback of various media files such as a portable media player (PMP), an MP3 player and a mobile phone is drastically increasing.

In case of the media player, an ultimate object thereof is to reduce a size thereof to improve a portability. Various semiconductor devices such as a semiconductor memory for storing the media file and a decoder chip are installed in the media player, and an LCD or OLED is installed for a display outside the media player. Reducing the size of the media player is limited due to the various semiconductor devices. When a number of the semiconductor devices are reduced, a quality of sound is degraded.

SUMMARY OF THE INVENTION

It is an object of the present invention to provide a detachable necklace type sound reproduction apparatus wherein an acoustic sound is delivered to an ear of a user without using an earphone or a headphone and a high performance amplifier is used to provide high quality sound.

In order to achieve the above-described object, there is provided a necklace type sound reproduction apparatus detachable from a media player, the apparatus comprising: a wire attached to the sound reproduction apparatus to be worn on a user's neck; an interface module electrically connected to the media player to transmit and receive a data to and from the media player; a controller for decoding an audio data of the data received by the interface module to be output as an acoustic signal; and a stereo speaker module having two speaker disposed at end portions of the necklace type sound reproduction apparatus, the speaker module reproducing the acoustic signal being outputted from the controller in stereo, wherein the controller controls an output of the stereo speaker module according to a distance from the speaker module to ears of the user obtained from a length of the wire such that the acoustic signal reaches the ears of the user.

It is preferable that the controller comprises: a decoder module for decoding the audio data; and a digital amplifier for amplifying the audio data decoded by the decoder module to be output to the speaker module.

It is preferable that the controller comprises: a decoder module for decoding the audio data; a DAC module for converting the audio data decoded by the decoder module to an analog signal; and an analog amplifier for amplifying the analog signal to be output to the speaker module.

Preferably, the interface module comprises a wireless communication module for receiving the audio data from the media player.

It is preferable that the wireless communication module comprises one of a bluetooth module, a WiFi module and an RF module.

Preferably, the apparatus further comprises a power supply module for providing a power to the controller and the interface module.

It is preferable that the power supply module receives the power from the necklace type sound reproduction apparatus when attached to the media player.

It is preferable that the power supply module comprises: a rechargeable battery for storing the power provided from the media player; and a charger module for charging the rechargeable battery with the power provided from the media player according to a remaining amount of the power in the rechargeable battery.

Preferably, the apparatus further comprises a microphone for receiving a voice signal and transmitting the voice signal to the media player via the interface module.

Preferably, the apparatus further comprises an external speaker interface for transmitting the acoustic signal to an external speaker.

Preferably, the apparatus receives the audio data via a wired communication when attached to the media player and automatically switches to a wireless communication to receive the audio data when detached from the media player.

DETAILED DESCRIPTION OF THE INVENTION

The above-described objects and other objects and characteristics and advantages of the present invention will now be described in detail with reference to the accompanied drawings.

Figure 1:
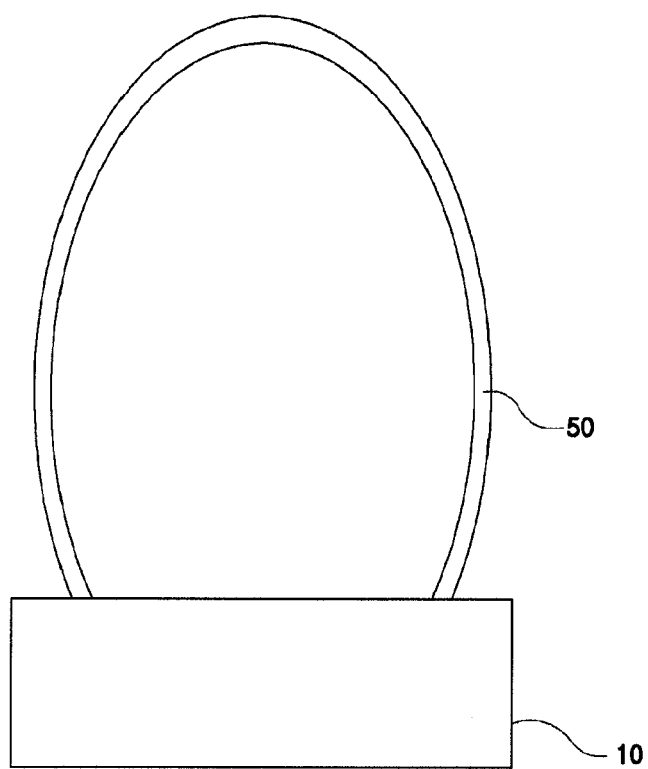
FIG. 1 is a diagram schematically illustrating a detachable necklace type sound reproduction apparatus in accordance with the present invention.
Figure 2:
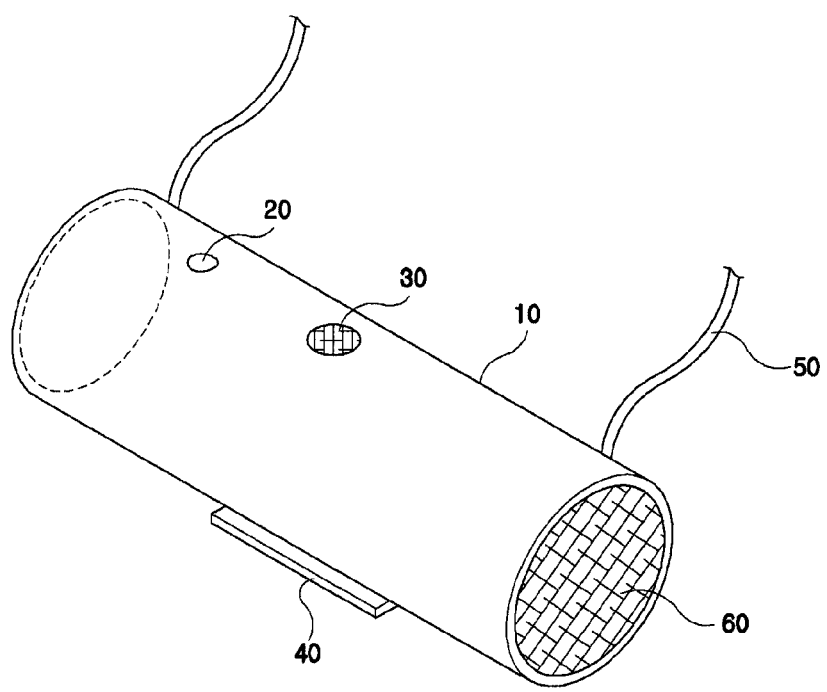
FIG. 2 is a diagram schematically illustrating a detachable necklace type sound reproduction apparatus in accordance with the present invention.

FIGS. 1 and 2 are diagrams schematically illustrating a detachable necklace type sound reproduction apparatus in accordance with the present invention.

Referring to FIGS. 1 and 2, the sound reproduction apparatus in accordance with the present invention comprises a wire 50 for wearing the apparatus on a user's neck, and a main body 10.

A speaker 60 is disposed at an end portion of the main body 10, and a microphone 30, an external speaker interface connector 20 for connecting to an external speaker and an interface connector 40 for a connection to a media player (not shown). The interface connector 40 is for transceiving various signals such as a digital audio signal and a control signal with the media player. The interface connector 40 allows the main body 10 to be mechanically attached to and detached from the media player.

A structure and an operating method of the sound reproduction apparatus in accordance with the present invention is described below with reference to FIGS. 3 through 8.

Figure 3:
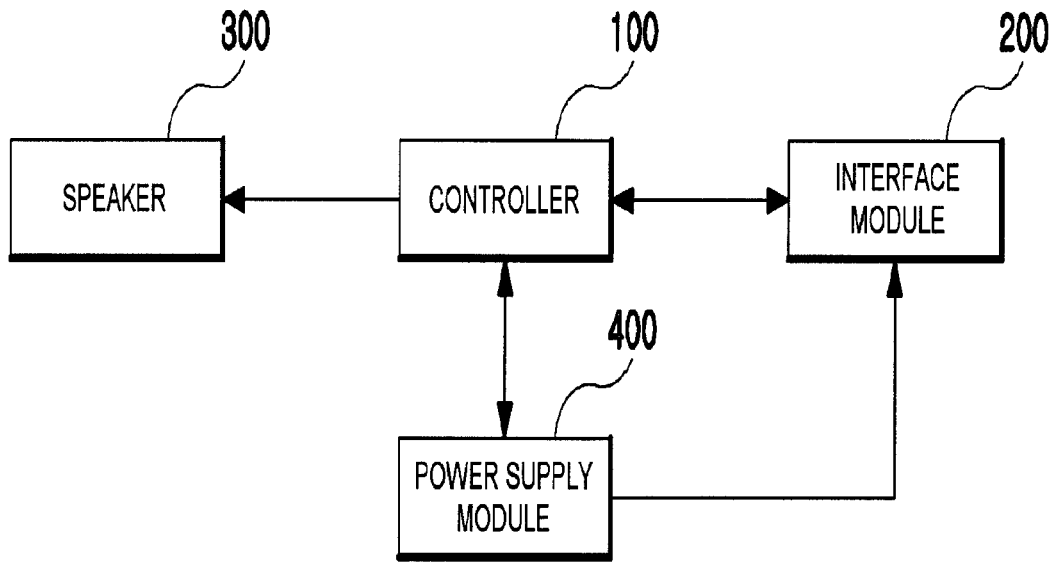
FIG. 3 is a block diagram illustrating a main body of a detachable necklace type sound reproduction apparatus in accordance with the present invention.

FIG. 3 is a block diagram illustrating the main body 10 of the detachable necklace type sound reproduction apparatus in accordance with the present invention.

Referring to FIG. 3, the main body 10 of the sound reproduction apparatus in accordance with the present invention comprises a controller 100, an interface module 200 and a speaker module 300. In addition, the main body 10 of the sound reproduction apparatus in accordance with the present invention may further comprise a power supply module 400.

The controller 100 decodes an audio data (the digital audio data, for instance) of the various data received by the interface module 200 from the media player and outputs the decoded audio data, i.e. an acoustic signal.

Particularly, the controller 100 controls an output of the speaker module 300 according to a distance from the speaker module 300 to an ear of a user such that the acoustic signal reaches the ear of the user. In order to achieve this, the controller 100 may include a signal processor.

The signal processor processes the audio signal decoded by the controller 100 by controlling the output of the speaker module 300 in a manner that the processes audio signal travels to the ear of the user. For instance, generally, when the user listens to a stereo signal through a speaker disposed in front of the user, an acoustic signal being outputted from a right speaker, an acoustic signal having a predetermined delay due to a reflection of the signal of the right speaker and an acoustic signal being outputted from a left speaker reach the user. In accordance with the present invention, when the signal processor processes the stereo signal according to an actual position of the speaker module 300 (which is obtained from a length of the wire 50), a sound may be outputted as if the speaker module 300 is in front of the user.

When various stereo enhancement is applied in addition to the signal processing, the sound is delivered to the user.

Figure 4:
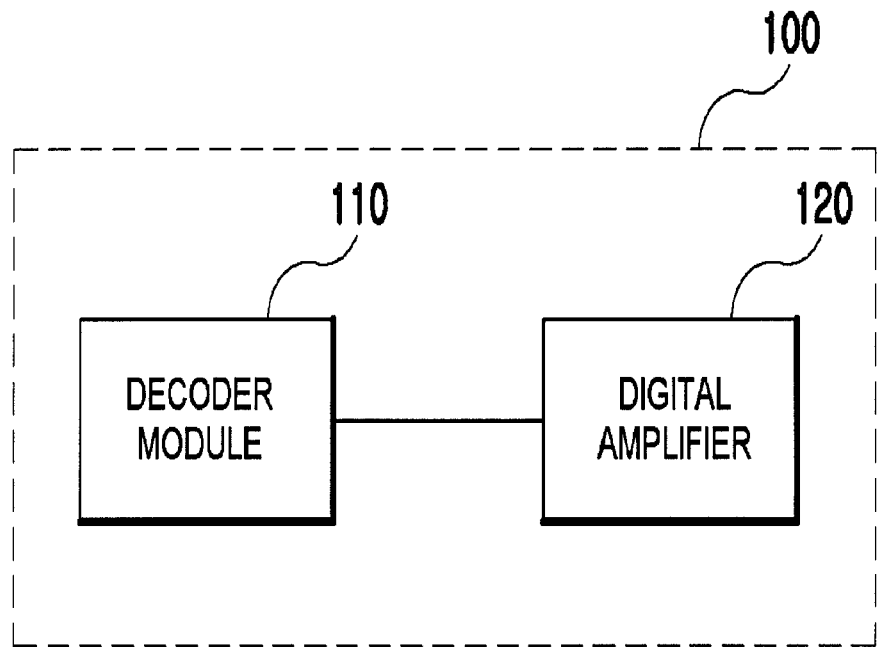
FIG. 4 is a block diagram illustrating a controller of a detachable necklace type sound reproduction apparatus in accordance with the present invention.

FIG. 4 is a block diagram illustrating the controller of the detachable necklace type sound reproduction apparatus in accordance with the present invention.

Referring to FIG. 4, the controller 100 comprises a decoder module 110 and a digital amplifier 120.

The decoder module 110 decodes the audio data. For instance, when the digital audio data stored in the media player is encoded in an MP3 format or a WMA format, the controller 100 converts the MP3 format or the WMA format to a PCM format. Methods for decoding various media formats is not within a scope of the present invention. Therefore, a detailed description is omitted.

The digital amplifier 120 amplifies the decoded audio data and outputs the amplified audio data to the speaker module 300.

The digital amplifier 120 is a type of an amplifier wherein a digital signal is directly received and amplified without being converted into an analog signal, thereby requiring no digital-to-analog converter (DAC).

CD, DVD, MD (magnetic disk), MP3 and HDTV utilize a music or a voice signal stored in digital formats. Generally, the music or the voice signal stored in the digital formats are first converted to the analog signal using the DAC installed in reproduction apparatus such as a CD player and the analog signal is amplified by an analog amplifier.

However, a noise is generated due to a thermal movement in the analog amplifier using a vacuum tube or a transistor, thereby degrading a small audio signal or causing a signal distortion.

In order to overcome above-described disadvantage, the digital amplifier converts the digital signal in the PCM (Pulse Code Modulation) format to a digital signal in a PWM (Pulse-Width-Modulation) format. Thereafter, the digital amplifier the digital signal in the PWM format is amplified, and the analog signal demodulated by a low pass filter is outputted through the speaker. Because the digital signal is amplified instead of the analog signal, a reproduction of an original sound is possible and the noise is reduced to one twentieth. Moreover, a number of required components is one tenth of the analog amplifier. Therefore, extremely small and light amplifier may be manufactured.

In addition, because the digital amplifier has a low power consumption and a small size, the digital amplifier may be easily employed by a HDTV, a computer, a portable electronic device, and may be manufactured as an single chip ASIC (application specific integrated circuit), thereby allowing a mss production at low manufacturing cost.

Figure 5:
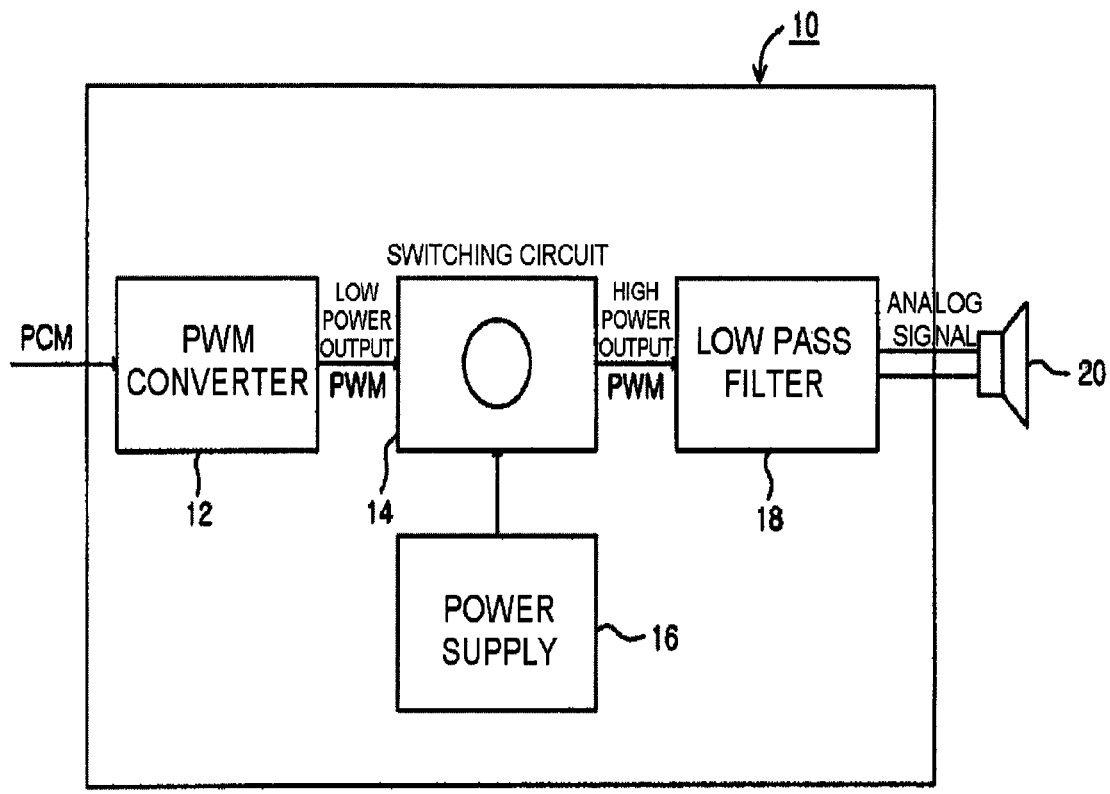
FIG. 5 is a block diagram illustrating a conventional digital amplifier applicable to a detachable necklace type sound reproduction apparatus in accordance with the present invention.

FIG. 5 is a block diagram illustrating a conventional digital amplifier 10 applicable to the detachable necklace type sound reproduction apparatus in accordance with the present invention.

Referring to FIG. 5, after a PCM digital signal is modulated into a low power PWM signal by a PWM converter 12, the low power PWM signal is inputted to a switching circuit 14 to which a high power supply is applied, thereby turning on and off a semiconductor switching device, a FET (Field Effect Transistor) for instance. The switching circuit 14 amplifies an amplitude of the low power PWM to a high power PWM signal. When the high power PWM signal is finally passed through a low pass filter 18, the high power PWM signal is restored to an original analog signal. The analog signal vibrates a speaker 20 to generate a sound.

Because an entire circuit of the digital amplifier 10 is a digital circuit except the low pass filter 18, the digital amplifier 10 may be integrated into a single chip. In addition, a manufacturer of the digital amplifier may employ an ASIC technology in order to facilitate adding, removing and changing of a desired specific application.

As described above, the sound reproduction apparatus in accordance with the present invention employs the digital amplifier to provide a low power consumption and a high quality sound.

In another embodiment of the present invention, the controller 100 may comprise a DAC module for converting the decoded audio data to an analog signal and an analog amplifier for amplifying the analog signal to be output to the speaker module 300.

The interface module 200 is electrically connected to the media player via wired/wireless communications to transmit and receive a data to and from the media player.

The interface module 200 is described below in detail with reference to FIG. 6.

Figure 6:
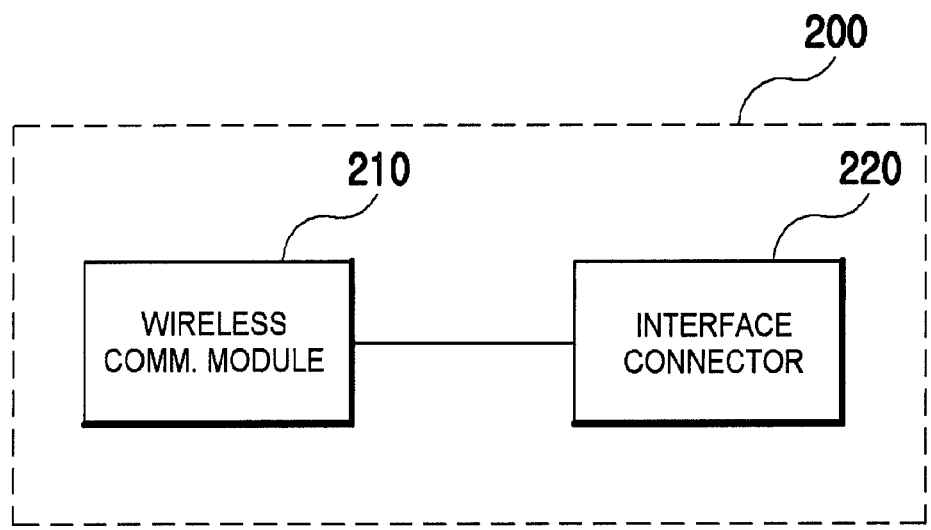
FIG. 6 is a block diagram illustrating an interface module of a detachable necklace type sound reproduction apparatus in accordance with the present invention.

FIG. 6 is a block diagram illustrating the interface module of the detachable necklace type sound reproduction apparatus in accordance with the present invention.

Referring to FIG. 6, the interface module 200 comprises a wireless communication module 210 and an interface connector 220.

The wireless communication module 210 receives and transmits the audio data and the control signal stored in the media player. The wireless communication module 210 may comprise a bluetooth module, a WiFi module (wireless LAN module) or an RF module, or may comprise a module that complies with a custom wireless communication protocol. The reception and the transmission of the audio data may carried out in various ways according to the module included in the wireless communication module 210. For instance, when the wireless communication module 210 includes the bluetooth module or the WiFi module, the digital audio data is transmitted as a digital signal. When the wireless communication module 210 includes the RF module, the digital audio data may be modulated and transmitted, and the transmitted data is demodulated when received.

The interface connector 220 communicates with the media player to transmit and receive various signals such as the digital audio signal and the control signal when sound reproduction apparatus is connected to the media player via the wired communication. The received signal is transmitted to the controller 100, and the interface connector 220 mechanically attaches the main body 10 to the media player as well as the transmission and the reception of the signal.

The main body 10 receives the audio data via the wired communication through the interface connector 220 when attached to the media player and automatically switches to the wireless communication to receive the audio data via the wireless communication module 210 when detached from the media player.

The speaker module 300 is disposed at an end portion of the necklace type sound reproduction apparatus 10, and reproduces the acoustic signal being outputted from the controller 100.

The necklace type sound reproduction apparatus in accordance with the present invention may further comprise the power supply module 400 for providing a power to the controller 100 and the interface module 200.

The power supply module 400 is described below in detail with reference to FIG. 7.

Figure 7:
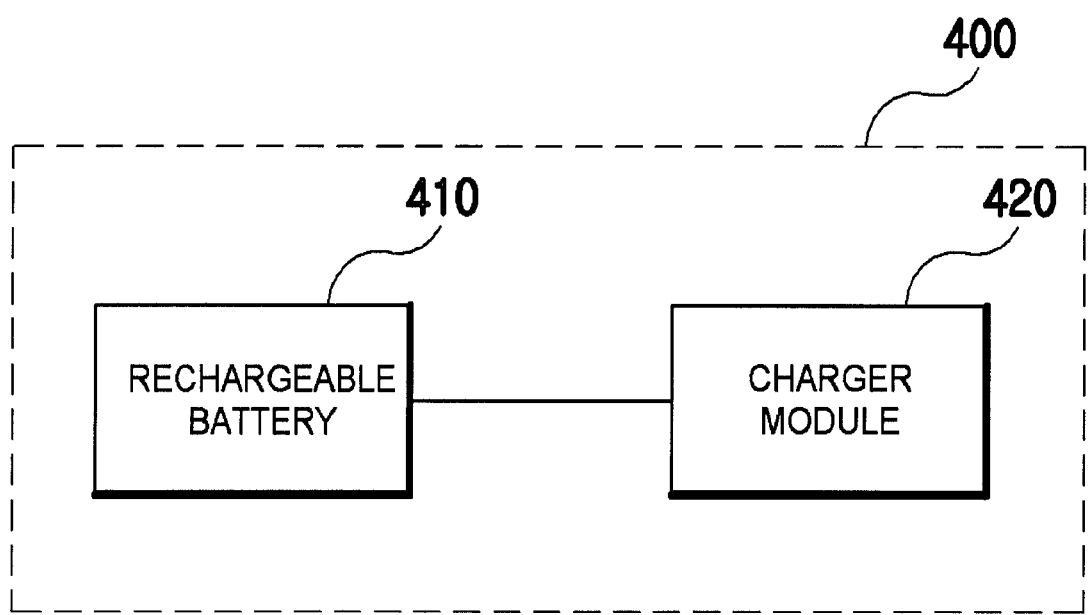
FIG. 7 is a block diagram illustrating a power supply module of a detachable necklace type sound reproduction apparatus in accordance with the present invention.

FIG. 7 is a block diagram illustrating the power supply module of the detachable necklace type sound reproduction apparatus in accordance with the present invention.

Referring to FIG. 7, the power supply module 400 comprises a rechargeable battery 410 and a charger module 420.

The rechargeable battery 410 stores the power provided from the media player according to a control of the charger module 420.

The charger module 420 charges the rechargeable battery 410 with the power provided from the media player according to a remaining amount of the power in the rechargeable battery 410.

The power supply module 400 may receive the power from the media player through the interface module 200 when the necklace type sound reproduction apparatus is attached to the media player, and the rechargeable battery 410 provides the power when the necklace type sound reproduction apparatus is detached from the media player.

In addition, the necklace type sound reproduction apparatus may further comprise the microphone 30 for receiving a voice signal and transmitting the voice signal to the media player via the interface module 200 and the external speaker interface connector 20 for outputting the acoustic signal to an external speaker (not shown).

The operating method of the detachable necklace type sound reproduction apparatus is described in detail below.

Figure 8:
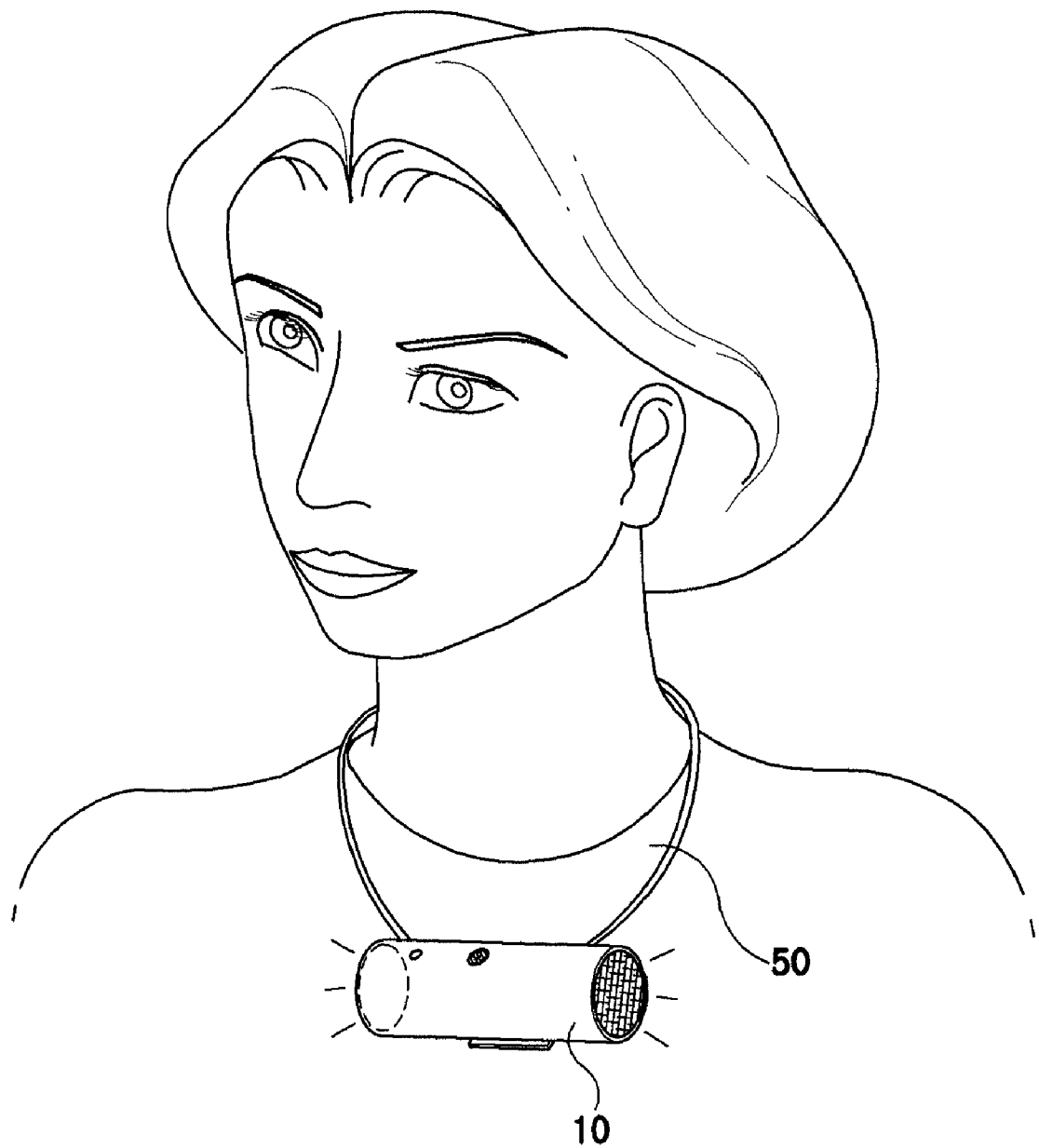
FIG. 8 is a schematic diagram illustrating a user wearing a detachable necklace type sound reproduction apparatus in accordance with the present invention.

FIG. 8 is a schematic diagram illustrating a user wearing the detachable necklace type sound reproduction apparatus in accordance with the present invention.

When the detachable necklace type sound reproduction apparatus detached from the media player is worn by the user, the output of the speaker 60 is adjusted according to a length of the wire 50 to deliver the output of the speaker 60 to the ear of the user.

Specifically, when the detachable necklace type sound reproduction apparatus is attached to the media player, the detachable necklace type sound reproduction apparatus receives the power, the audio signal and the control signal from the media player to reproduce the acoustic signal.

When the detachable necklace type sound reproduction apparatus is detached from media player, the controller 100 immediately recognizes the detachment and then controls the interface module 200 to automatically establish the wireless communication with the detachable necklace type sound reproduction apparatus (automatic wireless linking function). When the wireless communication is established, the detachable necklace type sound reproduction apparatus receives the audio signal and the control signal from the media player and reproduces the digital audio according to the control signal.

As described above, the detachable necklace type sound reproduction apparatus is advantageous in that a user may keep the relatively heavy media player in a bag and the relatively light the detachable necklace type sound reproduction apparatus may be worn on a neck of the user such that a portability is improved and provides an effective listening.

In addition, the sound may be transmitted to the rear of the user without using an earphone or a headphone to provide a hands-free function and an audio reproduction.

The detachable necklace type sound reproduction apparatus in accordance with the present invention is also advantageous in that the low power consumption and the high quality sound are provided by employing the digital amplifier.

What is claimed is:

1. A necklace type sound reproduction apparatus detachable from a media player, the apparatus comprising:
   a wire attached to the sound reproduction apparatus to be worn on a user's neck;
   an interface module for electrically connecting the apparatus to a media player to transmit and receive a data to and from the media player;
   a controller for decoding an audio data of the data received by the interface module to be output as an acoustic signal;
   a stereo speaker module having two speakers, each speaker being disposed at each end portion of a main body of the necklace type sound reproduction apparatus, the speaker module reproducing the acoustic signal being outputted from the controller in stereo; and
   an interface connector for detachably attaching the main body to the media player,
   wherein the controller controls an output of the stereo speaker module according to a distance from the speaker module to ears of the user obtained from a length of the wire such that the acoustic signal reaches the ears of the user.

2. The apparatus in accordance with claim 1, wherein the controller comprises:
   a decoder module for decoding the audio data; and
   a digital amplifier for amplifying the audio data decoded by the decoder module to be output to the speaker module.

3. The apparatus in accordance with claim 1, wherein the controller comprises:
   a decoder module for decoding the audio data;
   a DAC module for converting the audio data decoded by the decoder module to an analog signal; and
   an analog amplifier for amplifying the analog signal to be output to the speaker module.

4. The apparatus in accordance with claim 1, wherein the interface module comprises a wireless communication module for receiving the audio data from the media player.

5. The apparatus in accordance with claim 4, wherein the wireless communication module comprises one of a bluetooth module, a WiFi module and an RF module.

6. The apparatus in accordance with claim 1, further comprising a power supply module for providing a power to the controller and the interface module.

7. The apparatus in accordance with claim 6, wherein the power supply module receives the power from the necklace type sound reproduction apparatus when attached to the media player.

8. The apparatus in accordance with claim 6, wherein the power supply module comprises:
 a rechargeable battery for storing the power provided from the media player; and
 a charger module for charging the rechargeable battery with the power provided from the media player according to a remaining amount of the power in the rechargeable battery.

9. The apparatus in accordance with claim 1, further comprising a microphone for receiving a voice signal and transmitting the voice signal to the media player via the interface module.

10. The apparatus in accordance with claim 1, further comprising an external speaker interface for transmitting the acoustic signal to an external speaker.

11. The apparatus in accordance with claim 1, wherein the apparatus receives the audio data via a wired communication when attached to the media player and automatically switches to a wireless communication to receive the audio data when detached from the media player.

* * * * *